C. J. E. WATSON.
NUTCRACKER.
APPLICATION FILED NOV. 5, 1915.
1,203,086.
Patented Oct. 31, 1916.
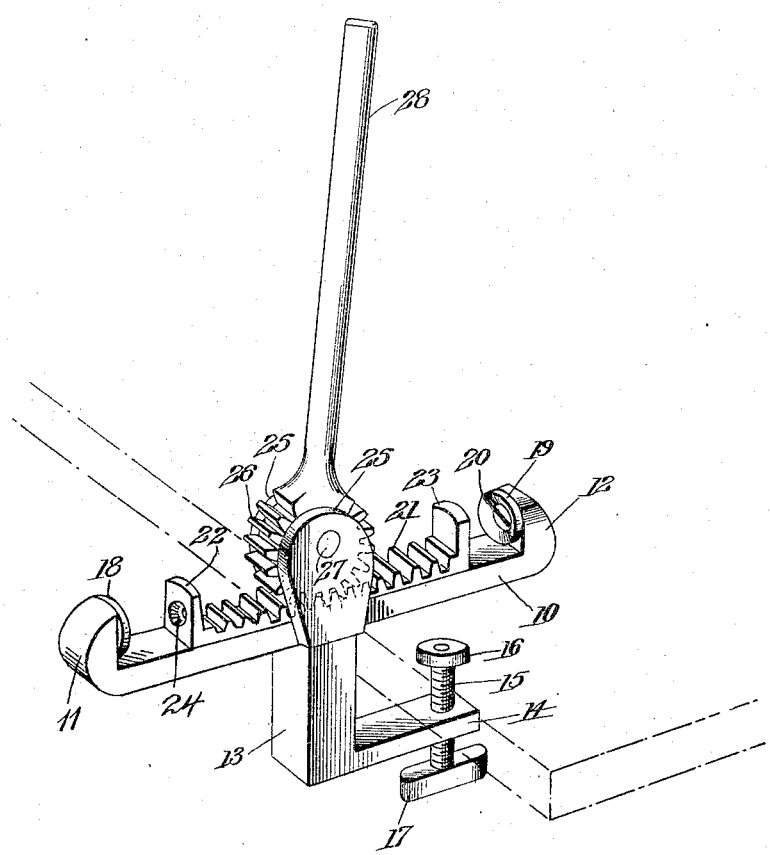
Witnesses
G. T. Baker
H. P. Jennings
Inventor
C. J. E. Watson
Foster, Freeman, Watson & Coit
Attorneys

UNITED STATES PATENT OFFICE.

CHARLES J. E. WATSON, OF DALLAS, TEXAS.

NUTCRACKER.

1,203,086.  Specification of Letters Patent.  Patented Oct. 31, 1916.

Application filed November 5, 1915. Serial No. 59,788.

*To all whom it may concern:*

Be it known that I, CHARLES J. E. WATSON, a citizen of the United States, residing at Dallas, county of Dallas, State of Texas, have invented certain new and useful Improvements in Nutcrackers, of which the following is a specification.

The object of the present invention is to provide a nut cracker of simple and comparatively inexpensive construction, having few parts and which may be conveniently operated.

One form of the invention is illustrated in the accompanying drawing which is a perspective view. Referring to the drawing, 10 indicates a bar having the upturned ends 11 and 12 and which is adapted to lie on the surface of a table or other support. A post 13 is secured to the lower side of the bar 10, being preferably formed integral therewith, and this post has an arm 14 arranged parallel with the bar 10 to provide a space for the support to which the cracker is to be secured. The arm 14 carries a screw 15 on the upper end of which is swiveled a head 16 adapted to coöperate with the under side of the support and clamp the nut cracker thereto. The screw 15 may be provided with a suitable head or thumb piece 17 by means of which it may be actuated.

The up-turned ends 11 and 12 are preferably provided with recessed disks 18 and 19, respectively, and these disks may be integral with the ends or secured thereto as by screws 20. Slidably arranged on the upper surface of the bar 10 is a rack 21 having the up-turned ends 22 and 23, these ends being preferably provided with recesses such as indicated at 24, to receive the nut. The recesses 24 are in alinement with the recesses in the disks 18 and 19 so that in the operation of the device the nuts will be securely held in the jaws formed by the coöperating up-turned ends 11 and 22, and 12 and 23.

At an intermediate point the bar 10 is provided with one or a pair of upwardly projecting lugs 25 on which is rotatably supported a small gear wheel 26, the lug or lugs 25 carrying a shaft 27 for this purpose. The teeth of the gear 26 mesh with the teeth of the rack 21 so that the rack will be moved back and forth on the bar 10 by rocking the gear. In order to conveniently rock the gear 26, there is provided a handle 28, preferably formed integral with the gear but which may be otherwise attached thereto, if preferred.

From the foregoing description and the drawing it will be apparent that if a nut is placed between the jaws 11 and 22 or between the jaws 12 and 23, and the gear 26 rocked by means of the handle 28, the nut will be subjected to a crushing force and the parts are so proportioned that a comparatively light force applied to the handle 28 will subject the nut to the requisite crushing pressure. The gear 26 meshes with the rack 21 in such a way that the jaws 11 and 22 may be separated a greater distance than the jaws 12 and 23, this being for the purpose of permitting large nuts to be cracked conveniently.

Having thus described the invention, what is claimed and desired to be secured by Letters Patent is:—

A nut cracker comprising a bar having its opposite ends upturned to provide cracking jaws, said bar also having a bracket projecting from the side thereof opposite said up-turned ends and lugs intermediate said up-turned ends and projecting in the same direction as the latter, a rack slidable on said bar between said up-turned ends and the ends of which coöperate with said up-turned ends to form separate pairs of cracking jaws of different apertures, a gear pivotally arranged between said lugs and meshing with said rack so as to hold the latter in position and a handle secured to said gear and whereby the latter may be oscillated.

In testimony whereof I affix my signature.

CHARLES J. E. WATSON.